United States Patent [19]

Pendse

[11] Patent Number: 4,707,829

[45] Date of Patent: Nov. 17, 1987

[54] CSMA-CD WITH CHANNEL CAPTURE

[75] Inventor: Sudhir B. Pendse, Plantation, Fla.

[73] Assignee: Racal Data Communications Inc., Sunrise, Fla.

[21] Appl. No.: 911,574

[22] Filed: Sep. 25, 1986

[51] Int. Cl.[4] .............................. H04J 3/00; H04J 3/24
[52] U.S. Cl. ........................................ 370/86; 370/94; 340/825.07
[58] Field of Search ........................ 370/86, 88, 89, 87, 370/85, 60, 9 A; 340/825.05, 825.06, 825.07, 825.5

[56] References Cited

U.S. PATENT DOCUMENTS 4,506,361  3/1985  Kume ...................................... 370/85
4,663,758  5/1987  Lambarelli et al. .................... 370/85

OTHER PUBLICATIONS

Andrew S. Tanenbaum, "Computer Networks", Prentice-Hall, Software Series, pp. 286-320, 1981.
Ira W. Cotton, "Technologies for Local Area Computer Networks", Computer Networks 4, pp. 197-208, (1980).
Gary J. Nutt and Douglas L. Bayer, "Performance of CSMA/CD Networks Under Combined Voice and Data Loads", IEEE Transactions on Communications, pp. 6-11, (Jan. 1982).
Imrich Chlamtac, William R. Franta and K. Dan Levein, "BRAM: The Broadcast Recognizing Access Method", IEEE Transactions on Communications, pp. 1183-1189, (Aug. 1979).
E. R. Hafner, Z. Nenadal and M. Tschanz, "A Digital Loop Diagnostic System", IEEE Transactions on Communications, pp. 877-880, (Jun. 1974).
N. Lee Rhodes, "Interaction of Network Design and Fiber-Optic-Component Design in Local Area Networks", Proceedings of IEEE, pp. 949-955, (1982).
Chong-Wei Tseng and Bor-Uei Cheng, "D-Net, A New Scheme for High Data Rate Optical Local Area Networks", Proceedings of IEEE, pp. 949-955, (1982).
Fouad A. Tobagi and Michael Fine, "Performance of Unidirectional Broadcast Local Area Networks: Expressnet and Fasnet", IEEE Journal on Selected Areas in Communications, pp. 913-925, (Nov. 1983).
Fouad A. Tobagi, Fleminio Borgonovo and Luigi Fratta, "Expressnet: A High-Performance Integrated-Services Local Area Network", IEEE Journal on Selected Areas in Communications, pp. 898-912, (Nov. 1983).
Wikhard M. Kiesel and Paul J. Kuehn, "A New CSMA-CD Protocol for Local Area Networks with Dynamic Priorities and Low Collission Probability", IEEE Journal on Selected Areas in Communications, pp. 869-876, (Nov. 1983).
Robert W. Metcalfe and David R. Boggs, "Ethernet: Distributed Packet Switching for Local Computer Networks", Communications of the ACM, pp. 395-404, (Jul. 1976).
Emile Soueid and Sudhir Pendse, "CSMA/CD with Channel Capture".

Primary Examiner—Benedict V. Safourek
Assistant Examiner—Frank M. Scutch, III
Attorney, Agent, or Firm—Jerry A. Miller

[57] ABSTRACT

This invention relates to an efficient CSMA/CD-based protocol for a local area network using an unidirectional global bus architecture, in which a ready station captures the bus for one packet time only if no other stations to its left transmit along with it. A modified version of the protocol provides a fairer access to the bus. This new scheme is a variable priority structure in which each station has a priority that changes dynamically with the state of the system. This is a contention scheme that behaves like a generalized and very flexible reservation protocol. A performance analysis of both versions of the protocol results in channel efficiency and transmission delay figures that are superior to those of the leading bus protocols.

8 Claims, 15 Drawing Figures

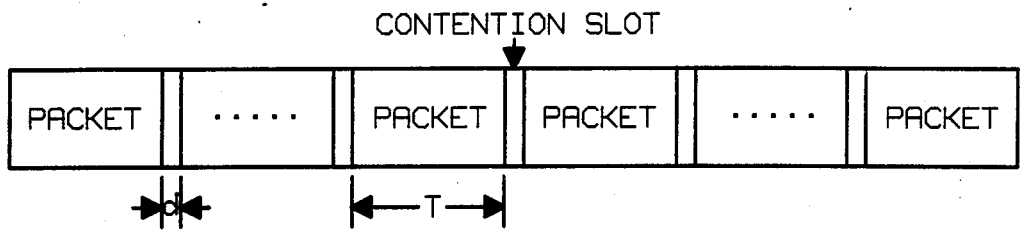
FIG. 2
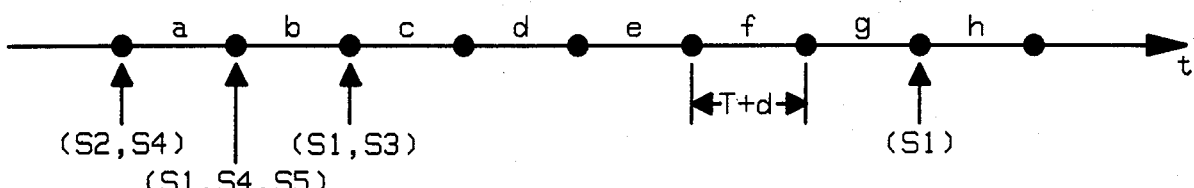
FIG. 3a
| STN. | FLAG | a | b | c | d | e | f | g | h |
|------|------|---|---|---|---|---|---|---|---|
| S1 | 0 |   | X/1 |   |   |   | X/1 |   | X/0 |
| S2 | 0 | X/1 |   |   |   |   | /0 |   |   |
| S3 | 0 |   |   | X/1 |   |   | /0 |   |   |
| S4 | 0 |   |   |   | X/1 |   | /0 | X/0 |   |
| S5 | 0 |   |   |   |   | X/1 | /0 |   |   |
FIG. 3b
| STN. | FLAG | a | b | c | d | e | f | g | h |
|------|------|---|---|---|---|---|---|---|---|
| S1 | 0 |   | X/1 |   | X/1 |   |   |   | X/0 |
| S2 | 0 | X/1 |   |   | /0 |   |   |   |   |
| S3 | 1 |   |   |   | /0 | X/1 |   |   | /0 |
| S4 | 1 |   |   |   | /0 |   | X/0 | X/0 |   |
| S5 | 0 |   |   | X/1 | /0 |   |   |   |   |
FIG. 3c
| LEGEND | |
|---|---|
| X/1 | STN. TRANSMITS, ITS FLAG WILL BE SET |
| X/0 | STN. TRANSMITS, ITS FLAG WILL BE RESET |
| /0 | STN. HAS ITS FLAG RESET BY ANOTHER TRANSMITTING STN. |
FIG. 3d

CSMA-CD WITH CHANNEL CAPTURE

BACKGROUND

1. Field of the Invention

This invention relates generally to the field of computer networks and more particularly to the field of CSMA local area networks.

2. Background of the Invention

A wide variety of multiple access schemes (or protocols) has been proposed and established for local area networks over the past several years. These schemes provide a set of efficient rules for providing virtual communication between all points (elements) of the network, while physical communication is provided by the channel itself. All of these protocols attempt to make optimal use of the bandwidth-limited resource, namely the common channel, while simultaneously minimizing the delays experienced by the stations connected to that channel. The available protocols can be broadly classified in three categories, namely, contention, limited contention, and reservation. Notable examples are the CSMA-CD (Carrier Sense Multiple Access With Collision Detection) contention protocol, and the MSAP (or Chlamtac's version, BRAM) reservation protocols.

In CSMA-CD, the time axis is divided into contention and transmission slots, with idle periods occuring in between, when no one is using the channel. The contention slot (d) is the channel (cable) round trip propagation delay, and the transmission slot (T) is the time required to transmit a fixed length packet.

CSMA-CD is a contention protocol developed for Ethernet in which ready stations listen to the channel and transmit only if the channel is found idle. All transmitting stations monitor the channel and terminate their transmission immediately if a collision is detected within a contention slot. The CSMA-CD mechanism is illustrated in FIG. 1.a for the case where there is at least one busy station at all times (no idle periods). An Ethernet coxial cable segment connecting N stations ($S_1$, $S_2$, ..., $S_n$) via transceivers is shown in FIG. 1.b.

The following is a brief analysis of the efficiency of CSMA-CD for constant loads (say (k) out of a total of N stations are always ready to transmit). In order to find the average length of the contention interval, assume that each ready station transmits (or retransmits after collision) in a contention slot with probability a. The probability A that one station will acquire the channel successfully is given by:

$$A = ka(1-a)^{k-1} \quad (1)$$

This quantity, A, is maximized for $a = 1/k$.

The probability, $P_j$ that a contention interval is of length j, is given by:

$$P_j = A(1-A)^{j-1} \quad (2)$$

Therefore, the average length of the contention interval, $\bar{j}$, is:

$$\bar{j} = \sum_{j=1}^{\infty} jP_j = \frac{1}{A} = \left(1 - \frac{1}{k}\right)^{1-k} \quad (3)$$

Noting that for each packet transmission, $\bar{j}$ contention slots on the average are lost, channel efficiency may be expressed as:

$$E_{CMSA-CD} = \frac{T}{T + \bar{j}} \quad (4)$$

It is well known that as the number of stations N increases, the average length of contention increases. In high loading environments, this can result in unacceptable delays. The present invention relives this problem allowing small delays for heavily loaded systems while providing little impact on lightly loaded systems.

DESCRIPTION OF THE DRAWINGS

FIG. 2 is a diagram of the CSMA-CD-CC packet format according to the present invention.

FIG. 3a shows an example of packet arrival times.

FIG. 3b shows a transmission sequence used in conjunction with example 1.

FIG. 3c shows a transmission sequence used in conjunction with example 2.

FIG. 3d is a legend for FIGS. 3b and 3c.

SUMMARY OF THE INVENTION

Figure 1A:
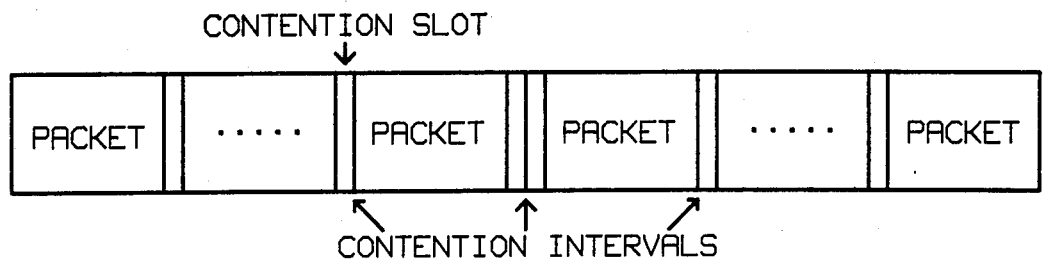
FIG. 1a is a diagram of the CSMA-CD packet format.

It is an object of the present invention to provide an improved protocol for CSMA-CD based computer networks.

It is another object of the present invention to provide an improved protocol for local area networks in which throughput at high loading is enhanced and the delay is bounded.

It is another object of the present invention to provide an enhancement to CSMA-CD which provides improved throughput at high loading while having little impact on the delay characteristics at lower loading.

These and other objects of the invention will become apparent to those skilled in the art upon consideration of the following description of the invention.

In one embodiment of the present invention, a method of providing access to an undirectional circular bus of electrical circumference d seconds having a plurality of stations coupled to a segment of the bus less than d/2 seconds in length, where electrical length is measured by the time required for an electrical signal to travel a predetermined distance; the method includes the steps of detecting an idle bus; transmitting a packet having a header approximately d seconds in duration; ceasing transmission of the packet if a collision is detected within d/2 seconds; and continuing transmission if a collision is detected after d/2 seconds. In a preferred method, the above steps are followed by the steps of setting a flag after the continuing step; detecting an idle bus a second time; waiting d/2 seconds; and beginning transmission of a second packet. This provides a mechanism for preventing certain stations from dominating the use of the channel. This procedure is followed if the station which captured the channel intends to transmit more than one packet.

In another embodiment of the present invention, an apparatus for allowing a station to access a unidirectional bus having a circular architecture with length d expressed in seconds of transmission time for a local area network, includes a monitoring circuit for determining that said bus is idle. A transmitter is provided for transmitting a packet onto the bus, the packet having duration greater than or equal to d. A collision detector is provided for detecting a collision on the bus and a timing circuit is responsive to the collision detector and the transmitter to determine whether or not the collision occurred within d/2 seconds of the start of transmission of the packet. Provision is made, responsive to the timing circuit, for ceasing transmission of the packet in the event the collision occurred within d/2 seconds of the start of transmission of the packet.

In a preferred embodiment, a storage register is provided for storing a flag. In response to the timing circuit the flag is stored in the storage register in the event no collision occurs within d/2 seconds of the start of transmission of the packet. A timer of duration d/2 is responsive to the storage register for inhibiting further attempts to transmit on the bus for the d/2 duration in the event the storage register contains the flag. The storage register is cleared in the event no collision occurs when the transmitter attempts to transmit after the d/2 duration. The storage registers of other similar stations are cleared in the event a collision occurs after d/2 seconds.

The features of the invention believed to be novel are set forth with particularity in the appended claims. The invention itself, however, both as to organization and method of operation, together with further objects and advantages thereof, may be best understood by reference to the following description taken in conjunction with the accompanying drawings.

DESCRIPTION OF THE INVENTION

Figure 1B:
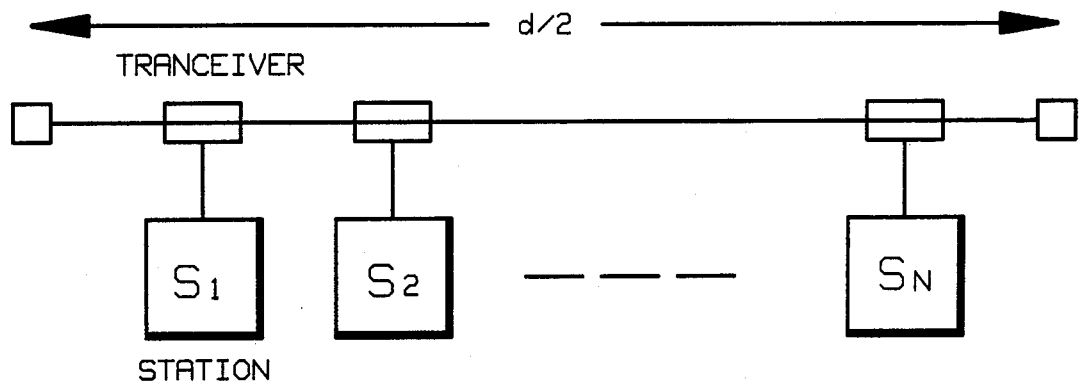
FIG. 1b shows a coaxial cable segment for an Ethernet network.
Figure 1C:
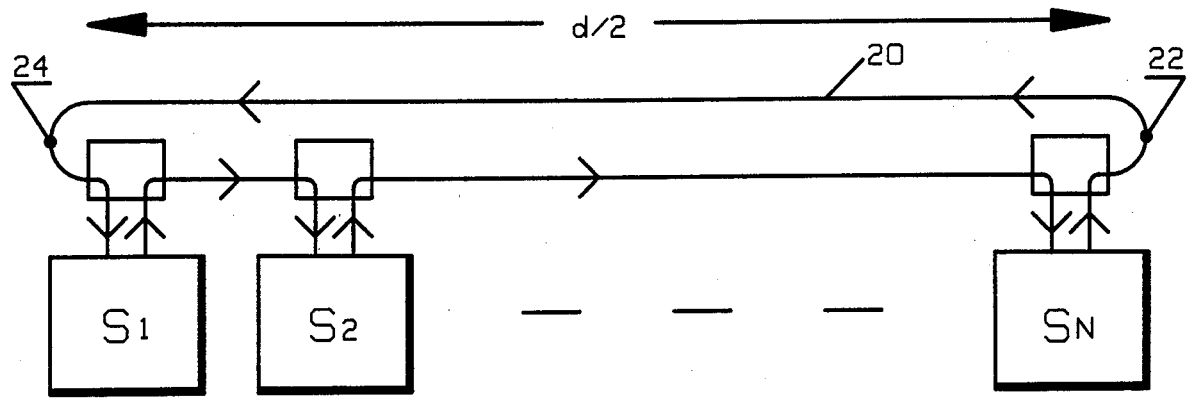
FIG. 1c shows a coaxial cable segment for the network of the present invention.

The present invention provides an efficient CSMA-CD based protocol for a synchronous local area network using the unidirectional global bus architecture shown in FIG. 1.c. This architecture places each station $S_1$ to $S_N$ on one side of a unidirectional loop. Transmitted information flows from the left-most station $S_1$ to the right-most station $S_N$ and returns from right to left along the upper connection 20. The length of the upper connection is approximately d/2 measured in time. That is, d/2 seconds are required for electrical signals to travel from node 22 to node 24. Similarly, approximately d/2 seconds are required for electrical signals to travel from node 24 to node 22. The total round trip time around the loop is approximately d and stations are located only along one segment of the loop d/2 in length.

In one embodiment of the present invention, each station is responsible for removing data transmitted by it onto the bus. This may be readily accomplished by repeating each transmission which originates at any other station and terminating the loop if the transmitting station successfully captures the loop.

Those skilled in the art will appreciate that the transmission times may be artificially manipulated by insertion of additional cable lengths between stations, insertion of delay elements, etc. in order to simplify circuit implementations if desirable without departing from the present invention. Of course, such delays will be reflected in system performance, however, such delays may allow for cost effective circuit implementation and may be an acceptable tradeoff in many circumstances. This protocol operates in the following manner.

Ready stations sense the channel using the Slotted Persistent CSMA/CD technique with a slot size (d).
(a) If the channel is found busy, persist on sensing until the channel becomes idle.
(b) If the channel is found idle, transmit at the beginning of the next contention slot. In this case, channel acquisition (or capture) by one of the contending stations is governed by the following two rules:
 (b-1) A station's transmission goes through if no other station to its left transmits along with it (assuming that stations transmit from left to right).
 (b-2) A station terminates its transmission if any station to its left transmits along with it.

The scheme described above guarantees a successful tranmission to the Left-most Transmitting Station (LTS). Those skilled in the art will recognize that the present invention could also be implemented using an analogous protocol wherein successful transmission is guaranteed to the Right-most Transmitting Station (RTS) and the bus is unidirectional in the opposite direction as that shown in FIG. 1C. The important factor is that exactly one packet goes through each time one or mores stations contend for channel access; meanwhile, the other stations have to wait for the channel to become idle again. This very desirable result can be accomplished if we make the two following observations.

(1) In the undirectional bus architecture, all ready stations transmitting simultaneously, except the left-most one, will detect a collision within (d/2) seconds. The LTS, however, detects a collision after (d/2) seconds, i.e., in the interval (d/2 to d). Parts (b-1) and (b-2) of the protocol can now be restated as follows: All contending stations detecting a collision within (d/2) seconds shall stop their transmission immediately. The one (and only one) station detecting a collision after (d/2) seconds shall capture the channel for an entire packet time.

Figure 7:
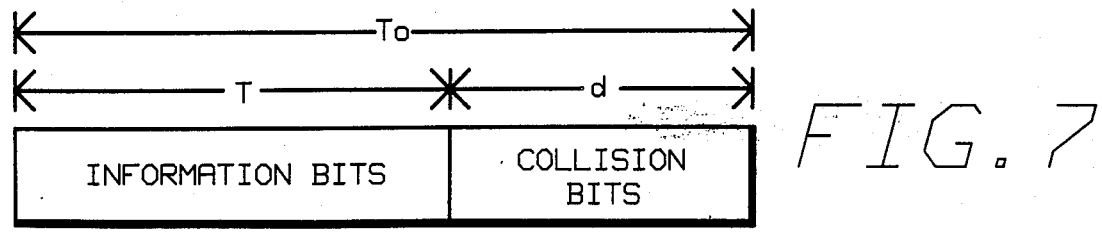
FIG. 7 is a diagram showing the format of packets transmitted over the network of the present invention.

(2) Appended to each packet header are a number of bits that act as collision bits (see FIG. 7). In the worst case, there should be enough of these bits to cover the channel round trip delay (d). With such a packet structure, an LTS can now transmit its full packet successfully since only those collision bits, and not the packet itself, will risk destruction.

The CSMA-CD-CC mechanism is illustrated in FIG. 2 for the case where no idle periods are present. We note that the transmission slots can be separated by *one and only one* contention slot. In this case, channel efficiency can be simply expressed as:

$$E_{CSMA-CD-CC} = \frac{T}{T+d} = \frac{T}{T_o} \tag{5}$$

Where the variables are defined as:

T = Time required to transmit the information portion of the packet (including addresses, etc.).

d = The round trip propagation delay.

$T_o$ = The time to transmit an entire packet including collision bits.

This efficiency remains constant as the number of busy stations increases. In pure CSMA-CD, however, the average length of the contention interval, $\bar{j}$, is bounded by (e) slots, so $\bar{j}$ is at most (ed) = 2.7d sec. Equation 4 then results in $T/(T+2.7d)$, an efficiency significantly lower than that given by Equation 5 above.

The embodiment of CSMA-CD-CC described in the previous subsection clearly favors stations connected to the left hand side of the cable, since a station captures the channel only if no other station to its left transmit along with it. Stations to the right might experience large unbounded transmission delays as the channel load increases.

A fairer access to the bus for all competing stations is needed. For this purpose, a modified version of the former protocol is presented. In this version, overutilization of resources by any one station, and indefinite delays are avoided in the following manner.

(1) Each station has a bit flag associated with it which may be stored in a register. Initially all flags are reset. A ready station sets its flag only if, while transmitting its packet, it detects a collision after (d/2) seconds from starting transmission (i.e. if it detects a collision but captures the channel for an entire packet time).

(2) A ready station with flag set is required to wait (d/2) seconds after sensing an idle channel, thus giving the chance to other ready stations with flags reset (especially those to its right) to transmit their packets.

(3) A ready station with flag reset is allowed to contend for channel access after sensing an idle channel. Among these stations with flags reset, the priority is always with the LTS.

(4) Finally, upon being successful in capturing the channel, a station with flag set will either (4-a) reset its own flag and all the other station flags, if it does not detect a collision at all, or (4-b) reset all the other stations flags, but keeps its flag set, if it detects a collision after (d/2) seconds from starting transmissions.

Step (4) eliminates the often unnecessary wait of (d/2) seconds for those ready stations with flags set.

This simple technique prevents the stations to the left from monopolizing the channel. In fact, a station will not be allowed to transmit again until all ready stations to its right each have one chance to capture the channel.

This new scheme is, in effect, a variable proirity structure in which each station has a priority that changes dynamically as the state of the system changes. For constant loads, (when the same k stations are always busy), the priority levels will be rotating among the busy stations in a manner similar to a reservation protocol like MSAP (Mini-Slotted with Alternating Priorities protocol). For non constant loads, this *contention* scheme behaves like a generalized *reservation* protocol, in the sense that the transmission priorities are given to stations on a highly dynamic and flexible basis (and not necessarily on a rotating basis), as will be seen in the following examples.

The following two examples demonstrate the operation of MCSMA-CD-CC. The examples differ only by the initial setting of the flags. In one example, all flags are initially reset. In the other stations ($S_3$ and $S_4$) have their flags set; the remaining stations have their flags reset.

The packet arrival time distribution used in both examples is shown in FIG. 3.a with N=5. Time is divided into slots, each of duration $T_o = T + d$ seconds. At the beginning of slots (a), stations ($S_2$ and $S_4$) are ready to transmit, and will complete for the channel according to the protocol. Station ($S_2$ will capture the channel and transmit its packet. Meanwhile, two new stations, ($S_1$) and ($S_5$) become ready, station ($S_4$) also generates a *new* packet. Each station has enough storage capacity to hold packets before they can be transmitted. All ready stations will complete for channel access at the start of slot (b); station ($S_1$) will capture the channel for that entire slot. Meanwhile, station ($S_3$) becomes ready; Station ($S_1$) also generates a *new* packet. All new and backlogged stations will complete for the channel at the start of slot (c). No new packets are generated in slots (d), (e), (f), and (g). Finally ($S_1$) generates one last packet at the start of slot (h).

The sequence of transmissions in both examples is clearly outlined in FIG. (3.b) and (3.c), and is self explanatory. In the first example, $S_2$, $S_3$, $S_4$, $S_5$, $S_1$, $S_4$, and $S_1$. We particularly note that, in slots (f) and (d) of examples (1) and (2) respectively, station $S_1$ captures the channel and resets all other station's flags according to the protocol. Finally, the following observations about MCSMA-CD-CC should be noted:

(1) The modified protocol ensures fairness in channel access. No station monopolizes the channel and no station experiences Indefinite delays. It is true that, within a cycle of maximum length (N) slots (of duration $T_0$ each), stations to the left have a slight advantage over those to their right. However, over a interval of time significantly larger than N slots, all stations are equal, and will have equal channel access rights.

(2) The protocol's dynamic behavior is amplified by these two examples. It is easy to see the inherent variable priority structure of the protocol.

(3) The present contention protocol, designed to improve on CSMA-CD, also compares favorably with MSAP. It out-performs MSAP, not only in channel efficiency, but also in transmission delay, as will be seen.

Figure 4:
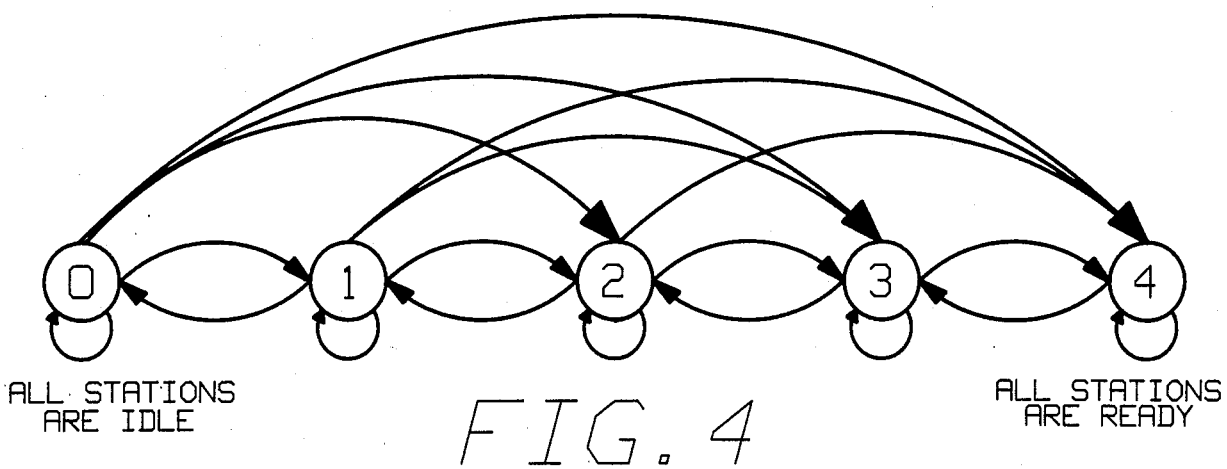

Turning now to FIG. 4, a simple Markov model to find the average station transmission delay in MCSMA-CD-CC is developed. Delay is here defined as the waiting time experienced by a ready station before it captures the channel and transmits its packet or, in case of multiple packets, the waiting time between successive transmissions.

As noted earlier, over an interval of time significantly larger than ($NT_0$) seconds, all stations would appear to have equal channel access rights, irregardless of their physical distribution over the channel. Therefore, the station delay is the same for all stations connected to the channel. Moreover, to keep the mathematical analysis tractable, assume all stations generate, on the average, the same amount of traffic. Let p represent the effective transmission probability of any station per slot of duration $T_0$.

The state of our system, using the MCSMA-CD-CC protocol, can be completely described by telling how many stations are ready to transmit their packets in any given slot. For example, the system is said to be in state (K) in a certain slot (of duration $T_0$), if (k) stations were ready at the beginning of that slot. For a system with (N) stations, there is a total of (N+1) stations (0, 1, 2, ..., N). In state (0), all stations are idle. In state (N), all stations are ready to transmit.

The present system moves around among a finite number of discrete stations in discrete time slots and can, therefore, be modeled using a Markov process. FIG. 4 shows all the possible transitions for a four station (N=4) Markov model of MCSMA-CD-CC. The state of the system varies from one slot to another as ready stations transmit their packets and as new stations become ready. Although the state can increase by more than one during any given slot, decreases are always in unit of one, since only one station can transmit successfully in a slot.

Analyzing the behavior of a Markov process amounts to calculating the transistion probabilities, $P_{ij}$, that system in state (i) moves to state (j) at the beginning of the next time slot. If the system is in state (i) in a certain slot, then the maximum number of stations (m) that could generate a new packet in the next slot is, $$m = (n-i) + 1 \tag{6}$$

The probability that (n) out of these (m) stations generate a new packet is P(m, N), $$P(m, n) = \binom{m}{n} p^n (1-p)^{(m-n)} \tag{7}$$

The transition probabilities can now be easily expressed in terms of P(m, n) as follows:

$$P_{i,i-1} = P(m,0) \tag{8}$$

$$P_{i,i} = P(m,1)$$

$$P_{i,i+1} = P(m,2) \quad i \in [1,N]$$

$$P_{i,j} = P(m,j-i=1)$$

$$P_{i,j} = 0, \text{ for } j < i-2$$

and $$P_{i,j} = P(N,j), \text{ for } i=0 \text{ and } \forall j \tag{9}$$

As time goes on, the system approaches equilibrium. At equilibrium, the possibility of finding the system in a particular state does not depend on time anymore. The equilibrium probability, $e_k$, of finding the system in state (k) can be determined by solving the set of simultaneous linear equations $$e_k = \sum_{i=o}^{N} e_i P_{i,k} \ (k = o, \ldots, N) \tag{10}$$

subject to the constraint that $$\Sigma e_k = 1.$$

Another way of finding the $e_k$'s is by multiplying the matrix ($P_{ij}$; i,j=0, ... N) by itself repeatedly until all rows of the resulting matrix are the same. Any one of the rows of the final matrix will give the equalibrium state probabilities.

Figure 5:
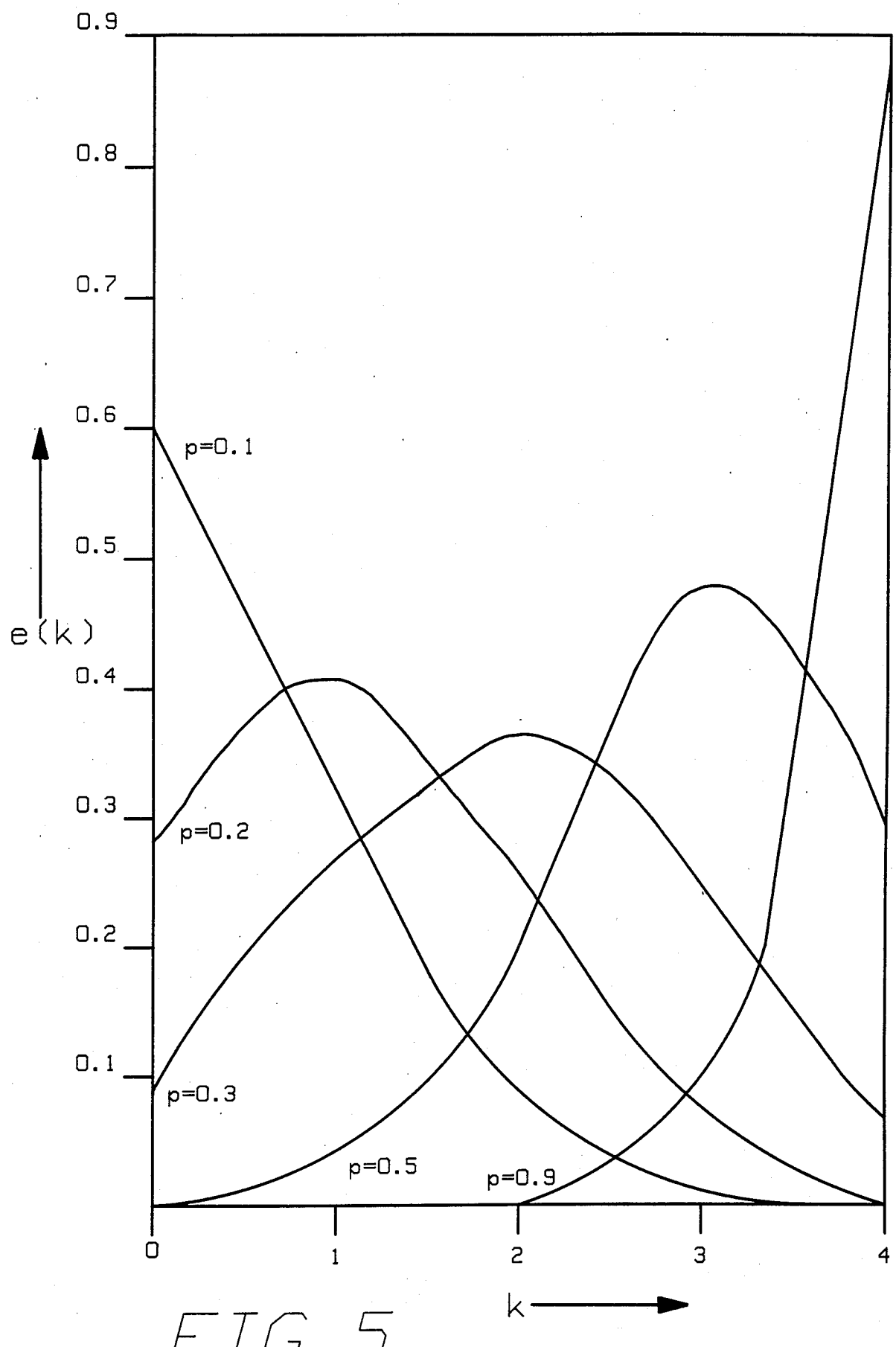
FIG. 5 shows equalibrium probabilities for N=4.

The equalibrium probabilities are plotted in FIG. 5 for different values of p and N=4. It should be noted that for small p, the system is most likely to be found in state (0). As the load increases, the system will be most likely found in higher states (the maximum value reached by the $e_k$s can be seen to drift to the right as (p) increases). It should also be noted that values of p=1/N (p=0.25 in the example) are considered as high loads. Any higher values of p will lead to increased storage requirements and possibly infinite queueing delays.

An expression for average delay will be readily available after making one final observation. If the system is in state (k), a ready station would have to wait, on the average, (k−1) slots before transmitting its packet. Therefore, the average station transmission delay can be expressed as.

$$D = \sum_{k=1}^{N} (k-1) e_k \tag{12}$$

Figure 6:
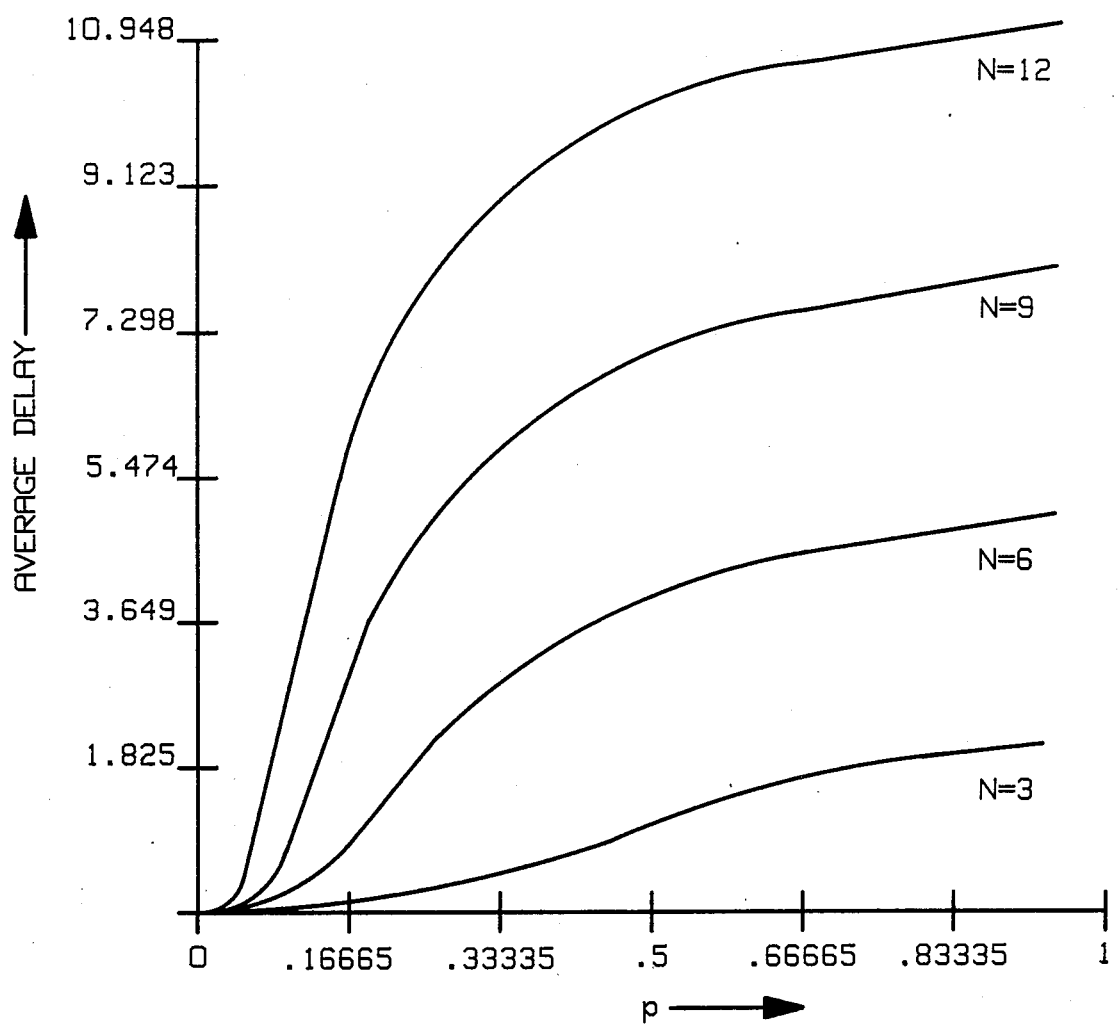
FIG. 6 is a graph of station transmission delays.

This delay is plotted vs. p and for different values of N in FIG. 6. We note that the average delay is bounded by (N−1) which corresponds to the case when all stations are continuously busy. This upper limit is reached for values of p significantly greater than 1/N. In MSAP, however, this same limit is reached much sooner, for values of p close to 1/N. For loads corresponding to (p<1/N), the advantages of MCSMA-CD-CC are even more pronounced since this scheme accounts for only those stations which are contending for channel access, as against all stations in MSAP.

FIG. 7 shows the preferred packet format for the present invention. According to this format, each packet is preceded by a group of collision bits lasting at least d in duration. These collision bits are followed by the information portion of the packet including any destination address, CRC, data, control, etc. This format allows any collision to take place without corruption of useful data or other information.

Figure 8:
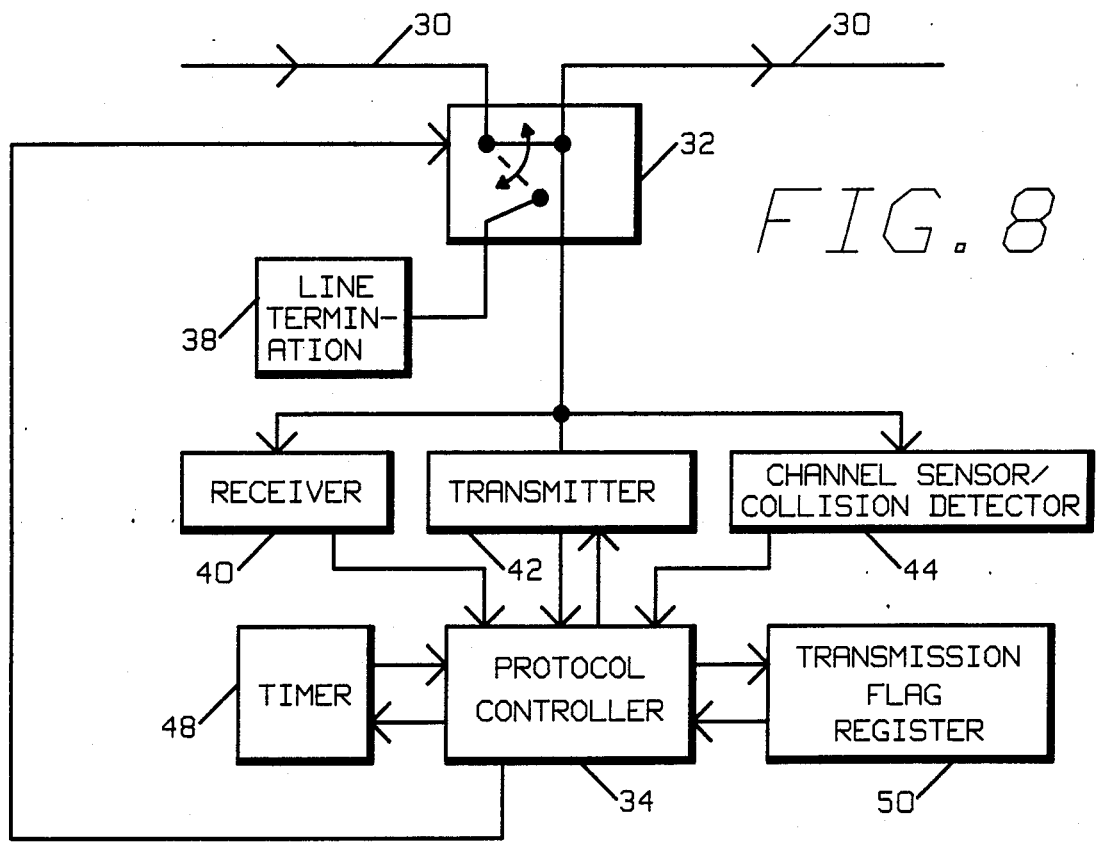
FIG. 8 is a functional block diagram of a single station operating according to the present invention.

Turning now to FIG. 8, a functional block diagram of the present invention is shown. In this embodiment, a unidirectional bus 30 is interrupted by a switching circuit 32 at each node of the network. Switching circuit 32 is under the control of a protocol controller 34 which either places the switch in the position shown in solid line so that the loop structure of the bus is retained or else connects the receiving side of the bus to a line termination 38 so that the bus is interrupted and transmissions are terminated. A receiver 40 and transmitter 42 are tied to the bus in parallel as is a channel sensor/collision detector 44.

Channel sensor/collision detector 44 is used to detect whether or not the channel is idle as well as whether or not a collision has occurred. This information is transmitted to protocol controller 34. Protocol controller 34 controls the activity of transmitter 42 and determines when transmitter 42 is allowed to transmit as well as shutting off transmitter 42 in the event of a collision, if the protocol so demands. A timer 48 is coupled to the protocol controller also and begins timing a duration of d/2 seconds upon command from the controller 34 in order to delay transmission or inspect for collisions within that time as required by the protocol.

Protocol controller 34 also is coupled to a transmission flag register 50 which stores the transmission flag when protocol requires it to be set and clears it when protocol requires it to be cleared.

Figure 9:
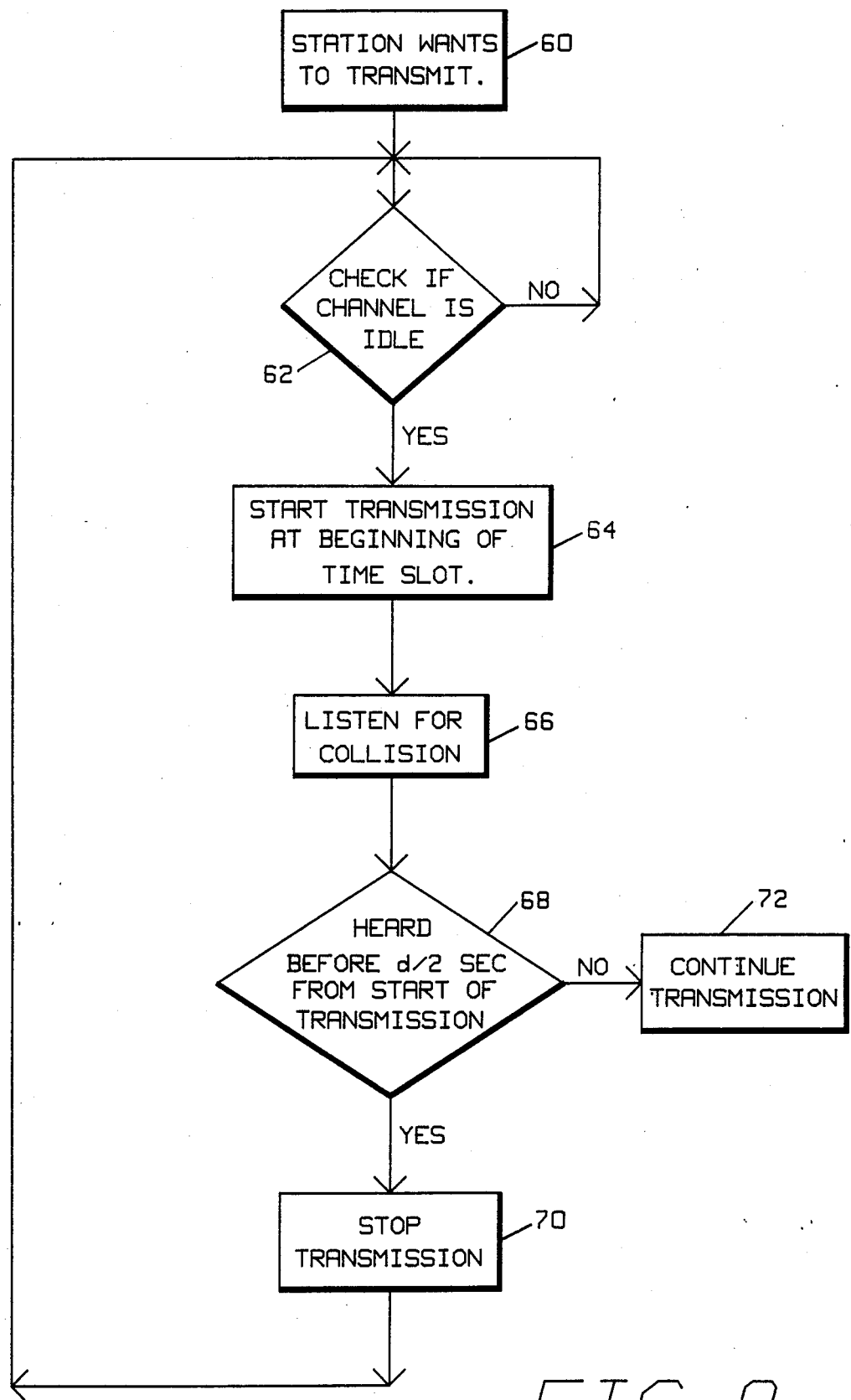
FIG. 9 is a flow chart describing the operation of the protocol controller of the present invention for the case of CSMA-CD-CC.
Figure 10:
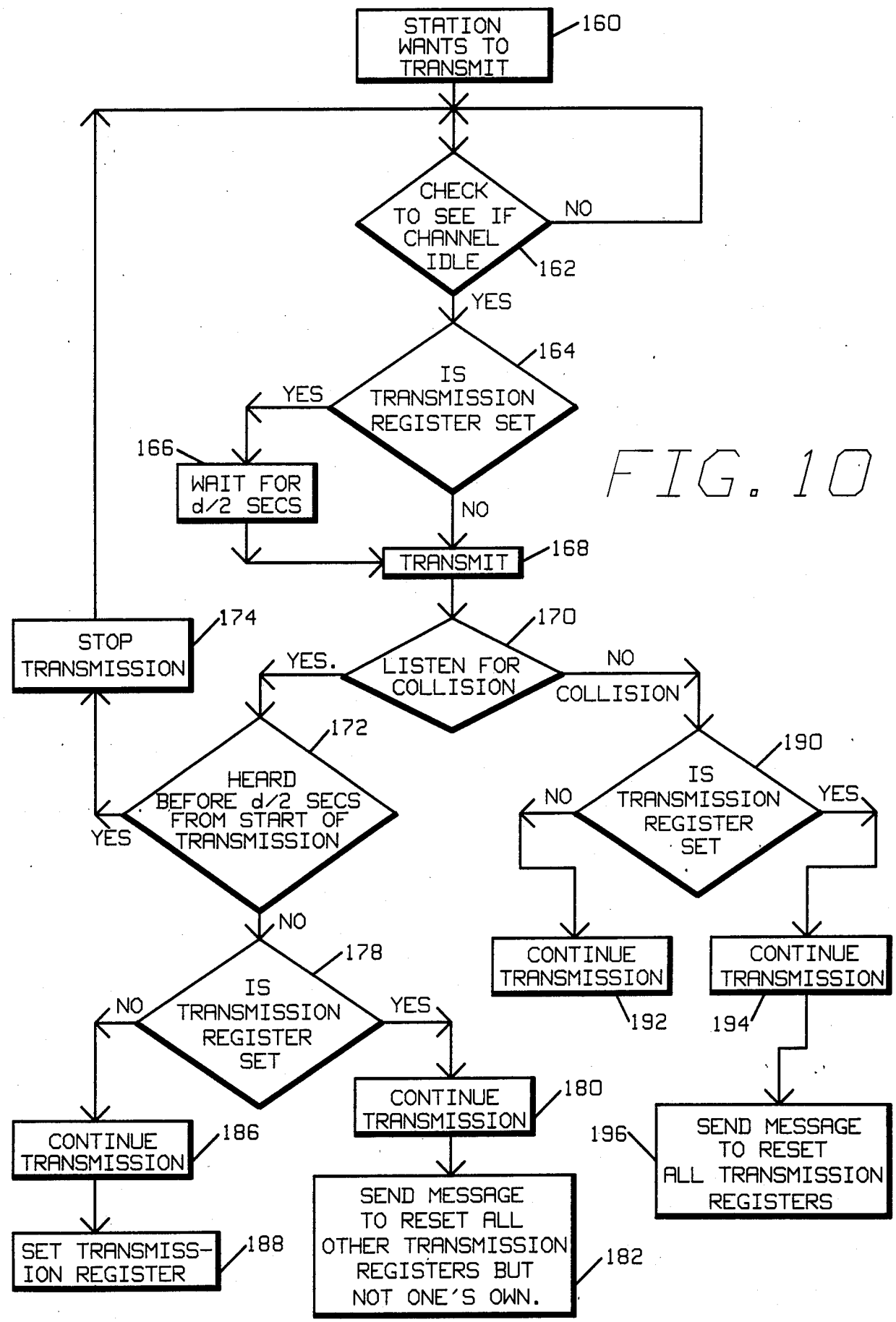
FIG. 10 is a flow chart describing the operation of the protocol controller of the present invention for the case of MCSMA-CD-CC.

The operation of the protocol controller 34 is described by the flow chart shown in FIG. 9 for the case of CSMA-CD-CC and FIG. 10 for the case of MCSMA-CD-CC. In order to simplify the explanation of the system's operation, neither of the two following flow charts explicitly describes the operation of closing and opening switch 32. This is readily handled, however, by simply realizing that the transmitting station is responsible for removing the signals from the bus which it generated (in the preferred embodiment). This allows for a mechanism for preventing the signals from circulating around the bus until dissipative effects eventually remove it. Other arrangements may also be possible. It should also be noted that due to the need for precise timing resolution, a minimum spacing between stations should be established depending upon the ability of current technology to resolve small time increments. Those familiar with Ethernet type systems will appreciate such constraints.

Turning now to FIG. 9, when a station desires access to the bus at step 60, it first checks channel sensor/collision detector 44 at step 62 to determine if the channel is idle. If so, transmission is started at the beginning of a transmission slot in step 64 and timer 48 is simultaneously started. In step 66 collision detector 44 inspects the bus for a collision. If a collision occurs and it is within d/2 seconds in 68, transmission is halted at step 70. If, however, no collision is detected at 68 within d/2 seconds, transmission continues at 72. From step 70, control passes back to step 62. If the channel is not idle in step 62, it continues checking until the channel is idle.

Turning now to FIG. 10, the operation of the MCSMA-CD-CC is described. At step 160 a station desires access to the bus. If a step 162, the channel is not idle, the station continues to look until the bus is idle. When the bus is idle, control passes to step 164 where the status of the transmission flag register 50 is inspected. If the flag is set, d/2 delay is initiated at step 166 after which transmission begins at step 168. If the transmission flag register 50 is not set at 164, control passes directly to 168 bypassing 166.

At step 170, collision detector 44 checks for a collision. If one occurs and it is within d/2 seconds in 172, transmission is halted at 174 and control returns to 162. If no collision occurs within d/2 seconds at 172, control passes to 178 where the transmission register is inspected. If the register is set, transmission continues at 180 and a message is sent to all other stations at 182 clearing the registers of all other stations. If the transmission register is not set at 178, transmission continues at 186 and the register 50 is set at 188.

If no collision occurs at 170, the transmission register 50 is inspected at 190. If the register is not set, transmission continues at 192. If the register is set, transmission continues at 194 after which a message is sent to all other stations resetting their registers at 196.

It should be noted that the messages at steps 192 and 196 are not included in the previous efficiency analysis. These messages may either be implemented as a control character forming a part of the packet format or by other methods that will be evident to those skilled in the art.

Thus, the present invention provides a CSMA-CD based limited contention protocol in which ready stations capture the channel on a priority basis that changes dynamically with the state of the system, and whose behavior resembles that of a generalized reservation scheme. The proposed protocol incorporates all the benefits of contention and reservation: (1) The channel efficiency is very high at low loading, remains constant and does not decrease with increasing loads; (2) The average packet transmission delay is bounded, as in the case of reservation protocols like MSAP. Moreover, the delay figures are significantly lower than those of MSAP since our scheme accounts only for the busy stations, and not all stations connected to the channel.

Thus it is apparent that in accordance with the present invention an apparatus that fully satisfies the objectives, aims and advantages is set forth above. While the invention has been described in conjunction with a specific embidoment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A method of providing access to an undirectional circular bus of electrical circumference d seconds having a plurality of stations coupled to a segment of said bus less than d/2 seconds in length, where electrical length is measured by the time required for an electrical signal to travel a predetermined distance; the method comprising:
   detecting an idle bus;
   transmitting a packet having a duration of at least d seconds;
   ceasing transmission of said packet if a collision is detected within d/2 seconds; and
   continuing transmission if a collision is detected after d/2 seconds.

2. The method of claim 1, followed by the steps of:
   setting a flat bit if said collision is detected after d/2 seconds;
   detecting an idle bus a second time;
   waiting d/2 seconds if said flag bit is set; and
   transmitting a second packet if no collision is detected within said d/2 seconds.

3. An apparatus for allowing a station to access a unidirectional bus having a circular architecture with length d expressed in seconds of transmission time comprising:
   monitoring means for determining that said bus is idle;
   transmitting means for transmitting a packet onto said bus, said packet having duration greater than or equal to d;
   means for detecting a collision on said bus;
   timing means respnosive to said collision detector and said transmitting means for determining whether or not said collision occurred within d/2 seconds of the start of transmission of said packet; and
   means responsive to said timing means for ceasing transmission of said packet in the event said collision occurred within d/2 seconds of the start of transmission of said packet and for continuing said transmission of said packet otherwise.

4. The apparatus of claim 3, further comprising:
   a storage register for storing a transmission flag;
   means responsive to said timing means for storing said transmission flag in said storage register in the event no collision occurs within d/2 secondds of the start of transmission of said packet; and
   a timer of duration d/2 responsive to said storage register for inhibiting further attempts to transmit on said bus for said d/2 duration in the event said storage register contains said transmission flag.

5. The apparatus of claim 4, further comprising means for clearing said storage register in the event no collision occurs when said transmitter attempts to transmit after said d/2 duration.

6. The apparatus of claim 4, further comprising means for clearing storage registers of other similar stations in the event a collision occurs after d/2 seconds.

7. The method of claim 2, further including the steps of:

clearing said flag bit if no collision occurs during transmission of said second packet if said flag bit is set; and transmitting a flag bit clearing message to one of said plurality of stations if no collision occurs during transmission of said second packet if said flag bit is set.

8. The method of claim 2, further including the step of:

transmitting a flag bit clearing message to one of said pluality of stations if a collision occurs after d/2 seconds of transmission of said second packet if said flag bit is set.

* * * * *